J. B. STRAUSS.
COUNTERBALANCING DEVICE.
APPLICATION FILED NOV. 6, 1908.
1,150,153.
Patented Aug. 17, 1915.
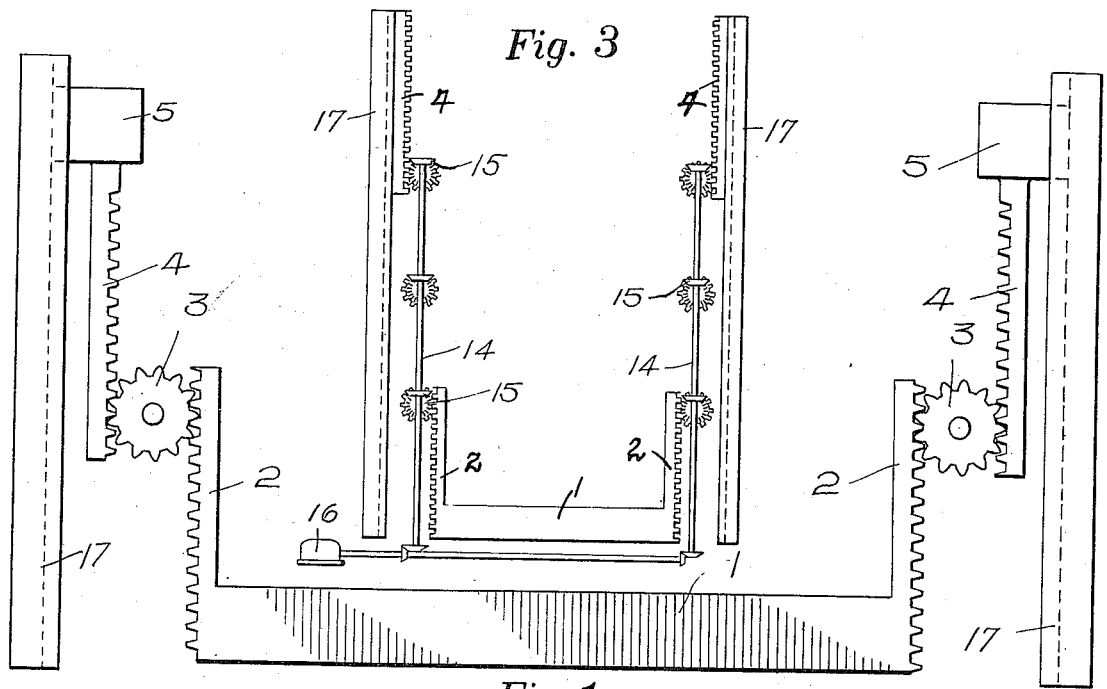
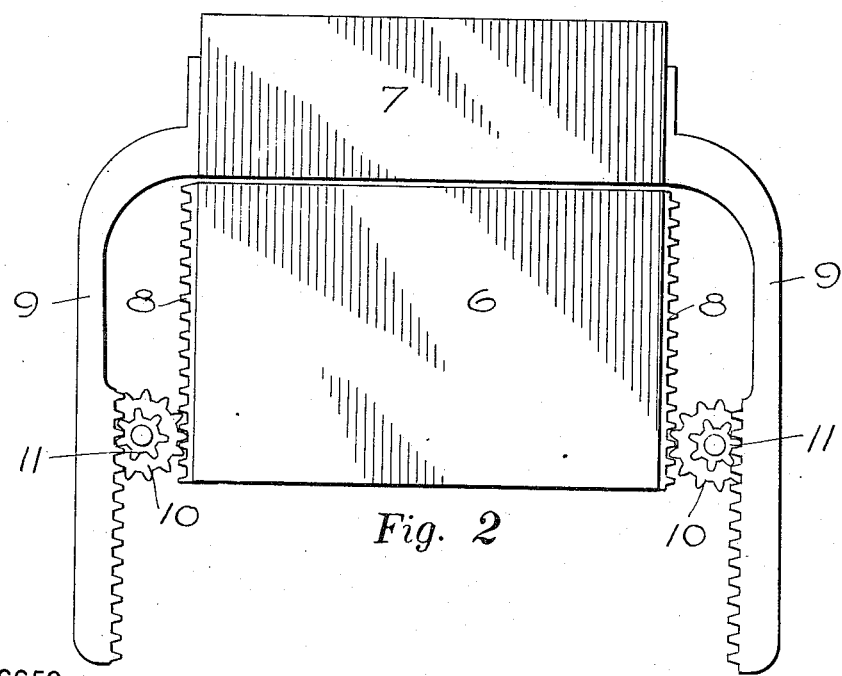
WITNESSES:
John M Culver
Edna K. Reynolds
INVENTOR
Joseph B. Strauss
By Parker & Carter
Attys

UNITED STATES PATENT OFFICE.

JOSEPH B. STRAUSS, OF CHICAGO, ILLINOIS.

COUNTERBALANCING DEVICE.

1,150,153. Specification of Letters Patent. Patented Aug. 17, 1915.

Application filed November 6, 1908. Serial No. 461,331.

*To all whom it may concern:*

Be it known that I, JOSEPH B. STRAUSS, a citizen of the United States, residing at Chicago, in the county of Cook and State of Illinois, have invented a certain new and useful Improvement in Counterbalancing Devices, of which the following is a specification.

This invention relates to counterbalancing devices, and can be used in connection with any device which it is desired to counterbalance.

In the drawing I have shown two forms of devices.

Figure 1 shows a construction for counterbalancing a single element; Fig. 2 shows a construction for counterbalancing a plurality of elements; Fig. 3 is a view showing a construction for securing a greater movement of the parts.

Like numerals refer to like parts throughout the several figures.

This invention is particularly adapted to be used in connection with bridges, elevating devices, doors, etc.

Referring now to Fig. 1, the movable element 1 which it is desired to counterbalance is provided preferably at each end with racks 2. These racks engage rotating pinions or gears 3 which are preferably mounted on any suitable stationary support. Racks 4 also engage these pinions or gear wheels, said latter racks being connected with the counterweight 5. It will thus be seen that the effect of the counterweight is applied to the moving element 1, and that the parts may be so balanced that said moving element may be lifted when a small force is applied thereto. It will be noted that as the element 1 lifts the counterweight the associated racks move downward.

In Fig. 2 I have shown two elements 6 and 7 adapted to be moved in opposite directions, and arranged to either wholly or partly counterbalance each other. The element 6 is provided with the racks 8 which engage gears 10. The element 7 is provided with racks 9 which engage gears 11 preferably mounted upon the same shaft as gears 10, or connected so as to rotate therewith. It will thus be seen that a downward movement of the element 6 will cause an upward movement of the element 7, and vice versa, and that the two elements thus counterbalance each other. If one element is heavier than the other, it may be necessary to apply additional counterbalancing material to it.

It will be seen that by this construction a simple, convenient and efficient counterbalancing construction is provided. Load and motion are simultaneously transmitted from one rack to the other, and the counterbalancing pinion is interposed between the racks. In the construction shown in Fig. 2 a differential counterbalancing pinion is used.

It is of course evident that a single rack may be connected with each part, and a single pinion used to coöperate with such racks, or that a plurality of racks and pinions may be used, and that they may be arranged to secure an extended range of motion of the parts. The pinions 3 may be operated in any desired manner. For purposes of illustration I have in Fig. 3 shown the pinions 3 as operated by means of a shaft 14 and beveled gears 15, the shaft being driven in any desired manner, as by means of the motor 16. The shaft 14 may, of course, be extended any desired length, and made to operate a series of pinions if desired. Such a construction is illustrated in Fig. 3 where a number of pinions are used, thus permitting the use of short racks, and at the same time providing for an extended motion of the parts. It will be seen that any desired number of pinions can thus be used. In this construction the racks 2 of the movable element 1 are not directly connected with the racks 4 when the parts are in the position shown in said figure, but the pinions connected with the racks 2 are connected with other pinions engaging the racks 4, by means of the intervening shafts 14. Some suitable guide for the counterweights may be used, such, for example, as the guide 17.

I claim:

1. A counterbalancing system comprising a part to be lifted and a moving counterweight part, a rack connected with each part, and a series of pinions located at different points and adapted to successively engage said racks as the parts move to and from each other.

2. A counterbalancing system comprising a part to be lifted and a moving counterweight part, a rack connected with each part, a series of power transmitting devices located at different points, and adapted to successively engage said racks as the parts move to and from each other, and a common shaft connecting all of said power transmitting devices.

3. A counterbalancing device comprising two parts, a rack connected with each part, and a pinion engaging both of said racks, one of said racks projecting beyond the part with which it is connected.

4. A counterbalancing device comprising a part to be lifted, a movable counterweight part, a rack connected with each part, one rack located above the other, so that there is a space between the adjacent ends of said racks, a pinion connected with each rack and means for moving each rack into engagement with the pinion of the other rack.

5. A counterbalancing system comprising a movable part, a movable counterweight part in the same vertical plane, a rack connected with each of said parts, both of said racks in the same vertical plane as the plane of said movable parts, and a pinion connecting with each of said racks, the rack connected with one of said movable parts projecting beyond the boundary lines of said part.

6. A counterbalancing device comprising two parts, racks connected with said parts, one of said parts having two racks connected therewith which project beyond the part, pinions engaging said racks, the line connecting said pinions being outside of the boundaries of said latter part when in its closed position.

JOSEPH B. STRAUSS.

Witnesses:
    EDNA K. REYNOLDS,
    SOPHIE B. WERNER.